E. A. HEIDTMANN.
FISHING LINE SUPPORT.
APPLICATION FILED FEB. 9, 1917.
1,304,876.
Patented May 27, 1919.
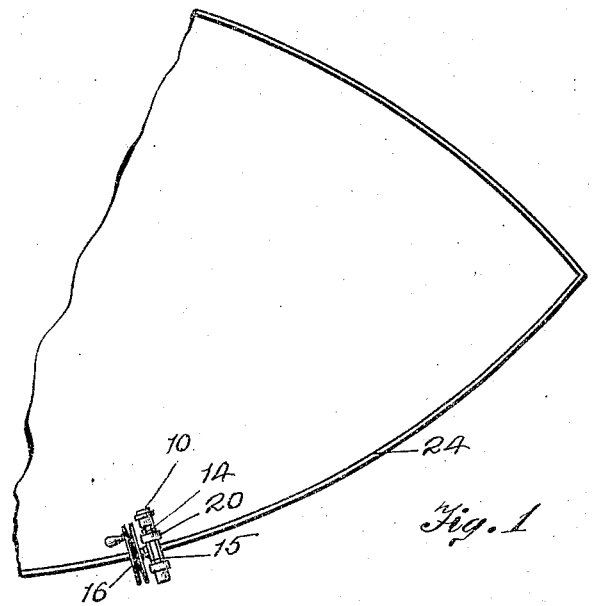
Fig. 1
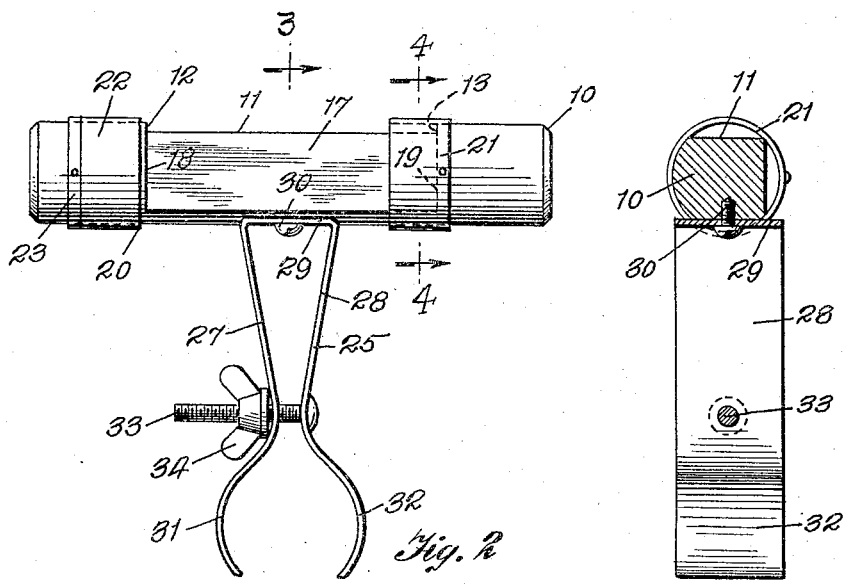
Fig. 2
Fig. 3
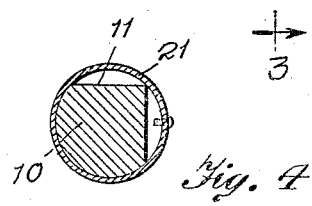
Fig. 4
Inventor
Ernst A. Heidtmann
By his Attorney
W. T. Criswell

UNITED STATES PATENT OFFICE.

ERNST A. HEIDTMANN, OF RICHMOND HILL, NEW YORK.

FISHING-LINE SUPPORT.

1,304,876.　　　　　Specification of Letters Patent.　　Patented May 27, 1919.

Application filed February 9, 1917. Serial No. 147,606.

*To all whom it may concern:*

Be it known that I, ERNST A. HEIDTMANN, a citizen of the United States, and a resident of Richmond Hill, in the county of Nassau and State of New York, have invented a certain new and useful Improvement in Fishing-Line Supports, of which the following is a full, clear, and exact specification.

This invention relates to a class of devices adapted to be used for fishing purposes.

My invention has for its object primarily to provide a support designed to be employed for still line fishing in a manner whereby a reel may be advantageously and conveniently used as well as serving to hold the reel and line to the rail of a boat or elsewhere without requiring them to be carried in the hand of the person doing the fishing; thus enabling the line to be conveniently manipulated to land the fish when caught. The invention consists essentially of a bar having a clamp serving as means to allow the bar to be detachably fastened to a support, and on the bar is an adjustable retainer for permitting a reel to be removably applied thereon.

A further object of the invention is to provide a fishing line support of a simple and efficient construction, and which is susceptible of being made in various sizes and shapes.

A practical embodiment of the invention is represented in the accompanying drawing forming a part of this specification in which similar characters of reference indicate corresponding parts in all the views, and will then be pointed out in the claims at the end of the description.

In the drawing, Figure 1 is a fragmentary view showing a top plan of part of a boat with one form of fishing line support embodying my invention applied thereto.

Fig. 2 is a side elevation of the device.

Fig. 3 is a sectional view taken on the line 3—3 of Fig. 2, and

Fig. 4 is a section taken on the line 4—4 of Fig. 2.

The device, or support has a bar 10 which may be of any desired length and shape, though the bar has preferably a circular periphery, and the central portion lengthwise of the top of the bar is cut-out, or recessed to provide a flat part, as 11, with upwardly projecting shoulders, or stops 12 and 13 at its ends so that the usual extending lugs, as 14 and 15, of a fishing line reel, as 16, may be applied on this flat part between the shoulders. Instead of the reel being arranged on the top of the bar it may also be used when desired on the side thereof by likewise cutting-out one side of the bar to provide a second flat portion 17 which terminates at two shoulders, or stops 18 and 19 formed at the ends of this flat portion.

In order to allow the reel to be removably held on the bar against accidental movement and displacement when applied on either the flat part 11 or on the flat part 17, an adjustable retainer, as 20, is provided. The retainer 20 may be of any preferred type, or may be of a well known form having a sleeve 21 secured on the bar 10 so that a portion thereof overhangs the shoulders 13 and 19 of the flat parts of the bar. On the opposite end of the bar 10 is a second sleeve 22 which is freely movable to and fro over the flat parts of the bar toward and from the first sleeve, and to prevent this second sleeve from becoming displaced from the bar, at the end of the bar adjacent to this sleeve is a stop, or ring 23 which is fixed to the bar so that the second sleeve will abut thereagainst when moved from over the flat parts, this adjustable sleeve being of a width so as to be entirely clear of the cutouts of the bar 10 which form the flat parts 11 and 17 when in contact with the stop to allow the reel to be applied to and removed from the bar. To removably mount the reel on either of these flat portions of the bar, the sleeve 22 is moved on the bar in abutting arrangement against the stop 23, and the reel is arranged in one of the flat portions so that its lug will be disposed under the overhanging part of the stationary sleeve 21, as illustrated. By guiding the sleeve 22 over the lug 14 of the reel it will be releasably held on the bar to allow the fishing line to be unwrapped and wrapped thereon in the usual manner by operating the reel.

To allow the bar 10 to be detachably fastened to the rail, as 24, of a boat, or other support, I provide a clamp, as 25. The clamp 25 may be of any well-known, or preferred form, though I prefer to employ the type of clamp illustrated which has an inverted substantially U-shaped body made preferably of sheet spring metal to provide two spaced fingers, or arms 27 and 28 adapted to be yieldingly moved toward and from each other, and one of the ends of these fingers are connected by a cross-plate 29 which is bolted, at 30, or otherwise secured to the underside of the bar 10 so that the body will depend therefrom. The lower free end parts of the fingers 27 and 28 of the U-shaped yielding body are curved outwardly and inwardly to provide gripping members 31 and 32 adapted to be disposed over the rail of the boat, and to removably clamp these gripping members to the rail from the central part of the finger 28 is a threaded bolt 33 movably projecting through an opening in the finger 27. On the bolt 33 is a thumb nut, as 34, which when rotated accordingly will contact with the finger 27 for yieldingly forcing the finger and its gripping member 31 toward the finger 28 and toward its gripping member 32, and in turn the device will be removably held firmly on the rail of the boat, or other support. In this manner I provide a simple and efficient support for still line fishing whereby a reel with its line may be conveniently manipulated without requiring the line to be carried in the hand of the person doing the fishing.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

1. The combination, in a fishing line support, of a bar having in its central part two communicating recesses formed so that the bottom of both recesses are relatively right angularly disposed, a fixed sleeve on one end of the bar, partly overhanging one of the ends of the recesses, another sleeve slidably adjustable on the second end of the bar toward and from the fixed sleeve, and means on the bar whereby the bar may be releasably attached to a support.

2. A fishing line support comprising a bar having in its central part a recess, a fixed sleeve on one end of the bar, partly overhanging one end of the recess, another sleeve slidably adjustable on the second end of the bar toward and from the fixed sleeve, in combination, with spring actuated means whereby the bar may be releasably attached to a support.

This specification signed and witnessed this 8th day of February A. D. 1917.

ERNST A. HEIDTMANN.

Witnesses:
 GEORGE F. BENTLEY,
 V. M. RUMPH.

Copies of this patent may be obtained for five cents each, by addressing the "Commissioner of Patents, Washington, D. C."